(12) United States Patent
Kim et al.

(10) Patent No.: US 8,072,557 B2
(45) Date of Patent: Dec. 6, 2011

(54) DISPLAY DEVICE HAVING A GUIDE FRAME FOR GUIDING A SLIDING MOVEMENT OF A BACKLIGHT UNIT

(75) Inventors: Dong-Soo Kim, Ansan-si (KR); Haw-Kyung Choi, Daegu (KR)

(73) Assignee: Alti-Electronics Co., Ltd (KR)

( * ) Notice: Subject to any disclaimer, the term of this patent is extended or adjusted under 35 U.S.C. 154(b) by 649 days.

(21) Appl. No.: 12/187,848

(22) Filed: Aug. 7, 2008

(65) Prior Publication Data

US 2009/0040416 A1 Feb. 12, 2009

(30) Foreign Application Priority Data

Aug. 8, 2007 (KR) .......................... 10-2007-0079452

(51) Int. Cl.
*G02F 1/1333* (2006.01)
(52) U.S. Cl. ............ 349/58; 349/65; 362/632; 362/97.1

(58) Field of Classification Search ..................... 349/58, 349/65, 60; 362/632, 633, 634, 97.1, 97.2; 348/794, 790; 345/87, 102
See application file for complete search history.

(56) References Cited

U.S. PATENT DOCUMENTS

| 7,095,457 B2 * | 8/2006 | Chou ............................ 348/794 |
| 7,108,525 B2 * | 9/2006 | Hisatomi ...................... 439/159 |

FOREIGN PATENT DOCUMENTS

| JP | 6-258643 | 9/2004 |
| KR | 100882587 | 2/2009 |

* cited by examiner

*Primary Examiner* — Thoi Duong
(74) *Attorney, Agent, or Firm* — The Farrell Law Firm, P.C.

(57) ABSTRACT

A display device is disclosed in the present invention. The display device includes a case including an install space inside the case, an opened display area at a front face of the case and a slit at a side of the case, the slit connected to the install space, a display panel attached to the case at the install space to be exposed to the display area, a backlight unit installed at the install space after the display panel through the slit by sliding engagement.

7 Claims, 4 Drawing Sheets

DISPLAY DEVICE HAVING A GUIDE FRAME FOR GUIDING A SLIDING MOVEMENT OF A BACKLIGHT UNIT

CROSS-REFERENCE TO RELATED APPLICATIONS

This application claims priority under 35 U.S.C. §119 to Korean Patent Application No. 10-2007-79452, filed on Aug. 8, 2008 in the Korean Intellectual Property Office (KIPO), the contents of which are herein incorporated by reference in their entirety.

BACKGROUND OF THE INVENTION

1. Field of the Invention

The present invention relates to a display device. More particularly, the present invention relates to a display device having a backlight unit.

2. Description of the Related Art

In general, a display device has a structure, which includes a display panel and a backlight unit received in a case for providing light source to the display panel. The case may consist of a rear frame, which receives the display panel and the backlight unit, and a front frame, which has an opening for the display panel and is combined with the rear frame to fix the display panel and the backlight unit.

In a manufacturing process, the display panel and the backlight unit are mounted on the rear frame, and are received into the case by combining the front frame with the rear frame. A power supply part and an external interface panel are mounted inside the case to supply power to the display panel and the backlight unit and to be capable of receiving an external signal.

The display panel and the backlight unit of the conventional display device are fixed at the inside of the case, so that the rear frame and the front frame should be separated for repairing the backlight unit. The display panel also should be separated from the frame for separating the backlight unit after the display panel.

The display panel requiring the backlight unit such as an LCD panel has thin thickness and is fragile by external impact, and the display panel may be damaged in the separating process of the display panel. Especially, the large-size display panel may be bended easily by a tension, so that more attention may be needed for separating and treating.

SUMMARY OF THE INVENTION

The present invention provides a display device being capable of detaching and attaching a backlight unit from a case without disassembling the case.

In one aspect of the present invention, the present invention provides a display device having a case with a slit.

In an exemplary embodiment, a display device includes a case including an install space inside the case, an opened display area at a front face of the case and a slit at a side of the case, the slit connected to the install space; a display panel attached to the case at the install space to be exposed to the display area; and a backlight unit installed at the install space after the display panel through the slit by sliding engagement.

According to the present invention, the display device receives the backlight unit through the slit, so that the backlight unit may be attached and detached without disassembling the case or separating the display panel from the case.

Thus, damage caused by the careless treatment of the display panel may be preventable, and the time for repairing or replacing the backlight unit may be minimized.

BRIEF DESCRIPTION OF THE DRAWINGS

The above and other advantages of the present invention will become readily apparent by reference to the following detailed description when considered in conjunction with the accompanying drawings wherein.

DESCRIPTION OF THE EMBODIMENTS

Hereinafter, the present invention will be described in detail with reference to the accompanying drawings.

Figure 1A:
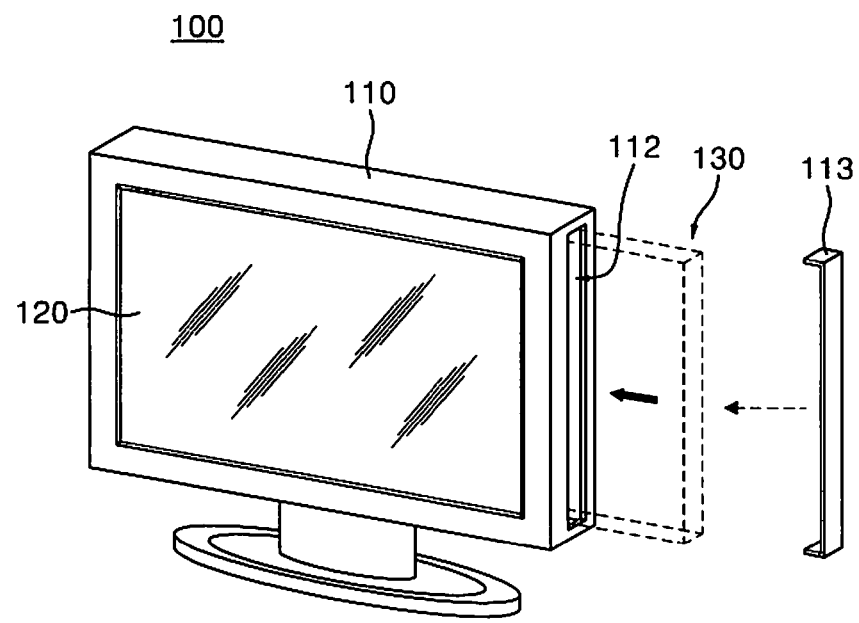
FIG. 1A is a perspective view illustrating a front face of a display device in accordance with an embodiment of the present invention.
Figure 1B:
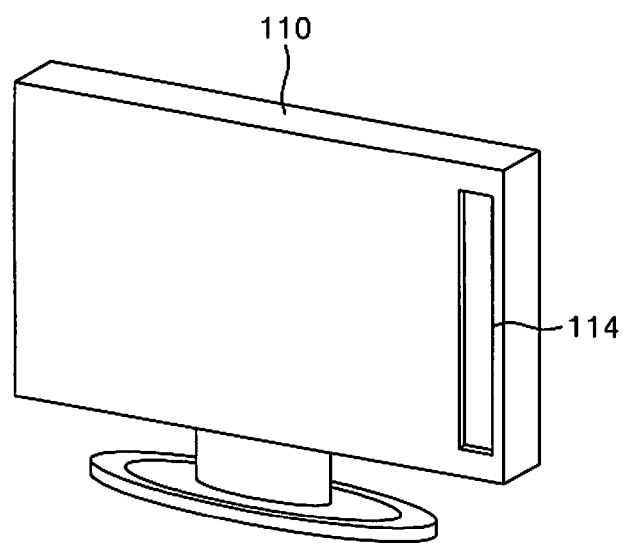
FIG. 1B is a perspective view illustrating a rear face of the display device in accordance with the embodiment of the present invention.

FIG. 1A is a perspective view illustrating a front face of a display device in accordance with an embodiment of the present invention. FIG. 1B is a perspective view illustrating a rear face of the display device in accordance with the embodiment of the present invention.

The display device of the present invention may be applied to a monitor. However, applications of the present invention are limited to the monitor and may be extended to a portable multimedia device having a display panel and a backlight unit and a television. Referring to FIGS. 1A and 1B, the display device 100 in accordance with an embodiment of the present invention, includes a case 110 having an install space disposed in the case 110 and a opened display area 120, a display panel 120 disposed in the install space and connected to the case, and a backlight unit 130 installed to the install space by sliding engagement.

The case 110 includes a slit 112 connected to the install space, and the backlight unit 130 may be combined or separated to the install space in the case through the slit 112 by sliding engagement.

The slit 112 is not limited to forming at a left side or a right side of the case 110, and may be formed at an upper side or a lower side of the case 110. Thus, the backlight unit 130 may be inserted from the upper side or the lower side of the case 110.

The display device in accordance with the embodiment of the present invention may further include an outline frame 113 covering the slit 112. The outline frame 113 may be combined to the side face of the case 110 attached to the backlight unit 130.

In the case 110, a power supply part is installed to provide power to the display panel and the backlight unit. The display panel may be connected to the power supply part in a manufacturing process of the case.

The backlight unit 130 may be connected to the power supply part when the backlight unit 130 is attached in the case. Thus, a gate 114 for connecting the backlight unit 130 to the power supply part may be formed at a rear face of the case 110.

A door may be installed at the gate 114, and the door may be installed as one selected form of various structures such as a sliding door, a push door, a hinged door and so on.

Figure 2:
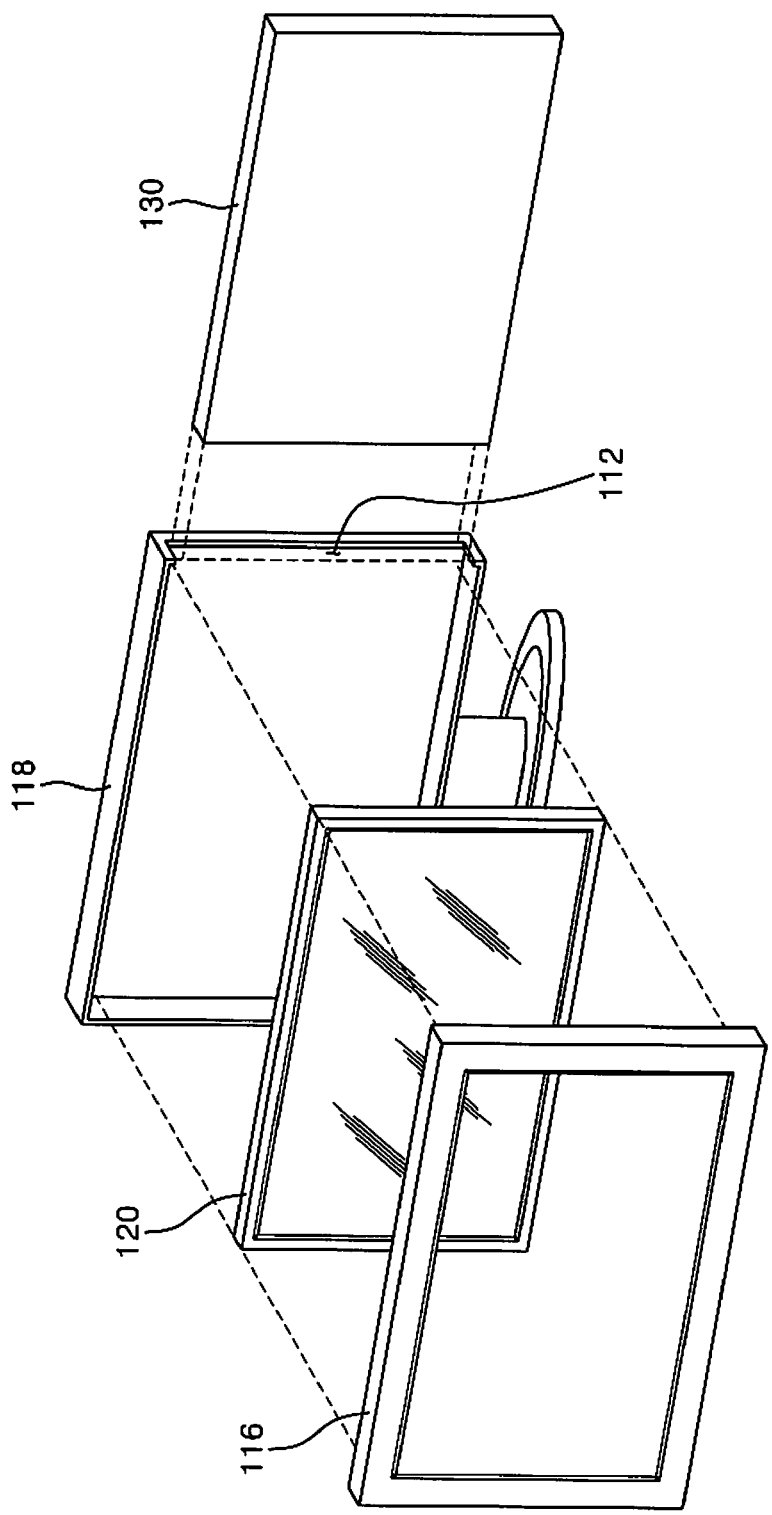
FIG. 2 is an exploded perspective view illustrating the display device in accordance with the embodiment of the present invention.

FIG. 2 is an exploded perspective view illustrating the display device in accordance with the embodiment of the present invention.

Referring to FIG. 2, the case in accordance with the embodiment of the present invention may include a front frame 116 and a rear frame 118.

The front frame 116 has opening exposing the display panel 120 received in the case, and the rear frame 118 has a receiving space for receiving the display panel 120 and the backlight unit 130.

The display panel 120 may be connected to the front frame 116, or may be combined by chassis having another shape for fixing the display panel 120 at the case. The chassis may be attached at the front frame 116 or the rear frame 118.

The display panel 120 is combined to the case in assembly process of the case, and the backlight unit 130 may be inserted into the case through the slit 112 by the sliding engagement after finishing the assembly of the case.

Figure 3:
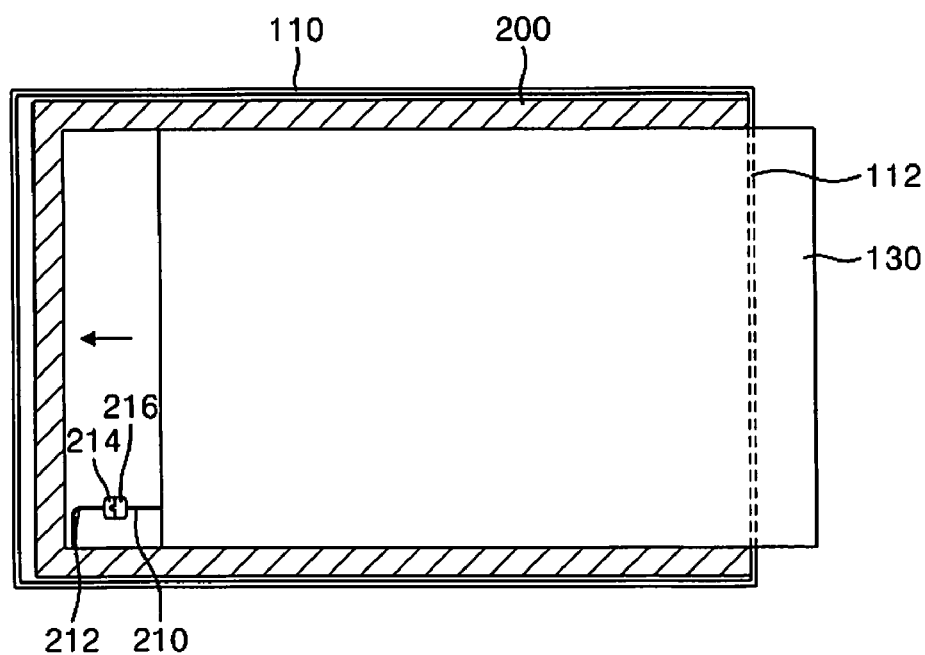
FIG. 3 is a plan view illustrating an install space of the display device in accordance with the embodiment of the present invention.
Figure 4:
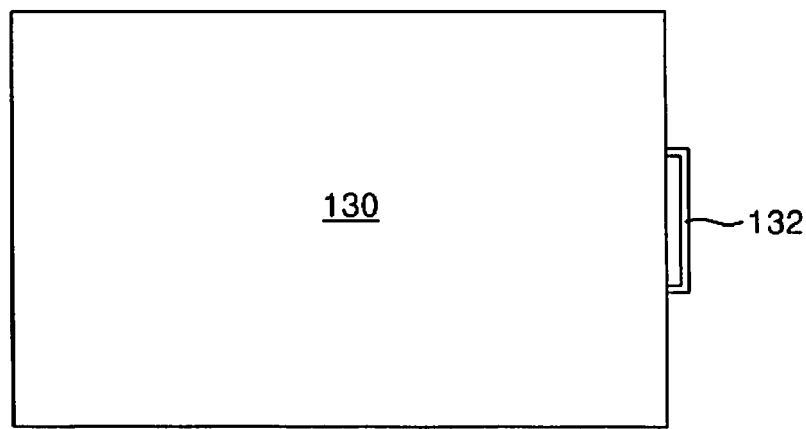
FIG. 4 is a plan view illustrating a backlight unit of the display device in accordance with the embodiment of the present invention.

FIG. 3 is a plan view illustrating an install space of the display device in accordance with the embodiment of the present invention. FIG. 4 is a plan view illustrating a backlight unit of the display device in accordance with the embodiment of the present invention.

Referring to FIG. 3, in the case 110 of the display device in accordance with the embodiment of the present invention, a guide frame 200 may be installed. The guide frame 200 supports the backlight unit 130 and guides a slide of the backlight unit 130. A guide rail may be formed as a contact point of the guide frame 200 and the backlight unit 130 with corresponding structures.

The backlight unit 130 may make contact with a power/signal supply part 212 and/or a display panel 120 as shown in FIG. 2. In the case 110, a lead-out connector 214 may be formed, and a lead-in connector 216, which connects with the lead-out connector 214, may be formed at the backlight unit 130.

When the backlight unit 130 is installed, the lead-out connector 214 and the lead-in connector 216 are connected with each other to provide power or a signal to the backlight unit 130.

In order to connect the lead-out connector 214 and the lead-in connector 216, the gate 114 may be formed at the rear face of the case 110 as illustrated in FIG. 1B. The gate 114 may be formed at the rear face of the case contacting with the lead-out connector 214 and the lead-in connector 216 when the lead-out connector 214 and the lead-in connector 216 are separated from the slit 122 and connected.

However, when the lead-out connector 214 and the lead-in connector 216 are exposed to be connected, and when the lead-out connector 214 and the lead-in connector 216 are adhered and connected by installing the backlight unit 130, the gate 114 may be not formed.

At least one of the lead-out connector 214 and the lead-in connector 216 may be connected to a cable. For example, the lead-out connector 214 is connected to a lead-out cable 212, and the lead-in connector 216 is connected to a lead-in cable 210.

In order to separate easily the backlight unit 130 from the case 110, a handle 132 may be installed at the backlight unit as illustrated in FIG. 4. The handle 132 is installed at an exposing face of the backlight unit 130 installed at the case 110, and is used for separating the backlight unit 130 from the case 110.

Figure 5:
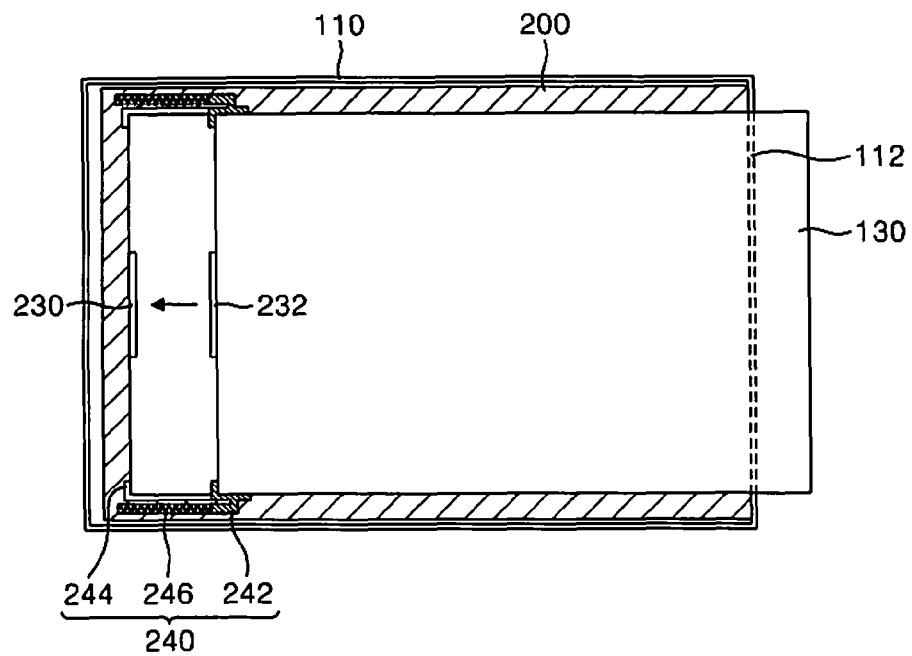
FIG. 5 is a plan view illustrating an install space of a display device in accordance with an embodiment of the present invention.

FIG. 5 is a plan view illustrating an install space of a display device in accordance with an embodiment of the present invention.

Referring to FIG. 5, as illustrated in FIG. 3, a guide frame 200 may be installed in the case 110. The guide frame 200 supports the backlight unit 130 and guides the slide of the backlight unit 130. A guide rail may be formed as corresponding structures at the contact point of the guide frame 200 and the backlight unit 130.

The backlight unit 130 may make contact with a power/signal supply part 212 installed in the case 110 and/or a display panel 120 as illustrated in FIG. 2. The lead-out connector 230 is formed in the case 110, and the lead-in connector 232, which is connected to the lead-out connector 230, may be formed.

The lead-out connector 230 is installed at the guide frame 200, and the lead-in connector 232 may be formed at the backlight unit 130. The lead-out connector 230 and the lead-in connector 232 are formed at the corresponding positions to each other.

The lead-out connector 230 and the lead-in connector 232 are installed at fixed positions of the guide frame 200 and the backlight unit 130. When the backlight unit 130 is combined by sliding engagement, the lead-out connector 230 and the lead-in connector 232 may be adhered and connected to each other.

The backlight unit 130 may be fixed in the case 110 by connecting the lead-out connector 230 and the lead-in connector 232.

The backlight unit 130 may be attached and detached in the case 110 by a push lock method. For example, the push lock member 240, which is moved to the guide flame at a predetermined distance and fixed by pressure and is moved back to an initial position by another pressure, may be formed at the guide frame 200.

The push lock member 240 includes a sliding cam 242 and an elastic member 246. The sliding cam 242 is moved at the predetermined distance and fixed when the pressure is applied, and the fixed part of the sliding cam 242 is released when the additional pressure is applied. The elastic member 246 provides a recovery power to the sliding cam 242 to move back the sliding cam 242 to the initial position. The guide frame 200 may further include a guide recess 244, at which the sliding cam 242 may be moved by a predetermined distance.

When the backlight unit 130 is installed at the case 110 along the guide frame 200, the backlight unit 130 is adhered to the sliding cam 242 to push the sliding cam 242. The sliding cam 242 is moved at the predetermined distance and fixed. The sliding cam 242 may be designed when the lead-out connector 230 and the lead-in connector 232 are combined.

The backlight unit 130 may be separated by pushing the backlight unit 130 from an outside of the case 110. When the pressure from the backlight unit 130 is delivered to the sliding cam 242, the sliding cam 242 is released from the fixed position to move back to the initial position by the elastic member 246.

The backlight unit 130 is exposed out of the case 110 by the movement distance of the sliding cam 242, so that the backlight unit 130 is separated from the case 110.

Figure 6:
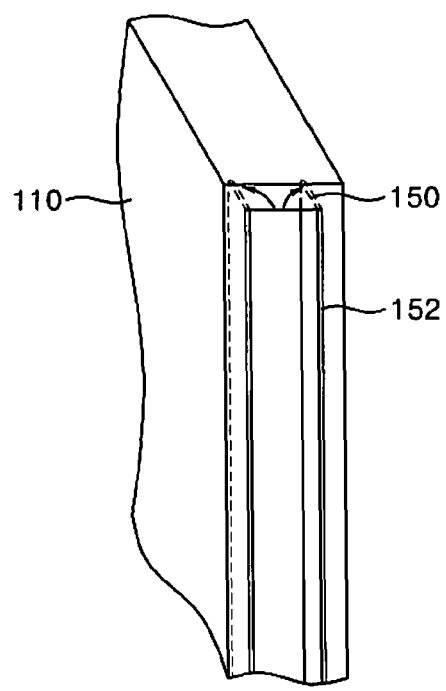
FIG. 6 is a perspective view illustrating a slit door of a display device in accordance with an embodiment of the present invention.

FIG. 6 is a perspective view illustrating a slit door of a display device in accordance with an embodiment of the present invention.

Referring to FIG. 6, in the case 110 in accordance with the embodiment of the present invention, a slit door 150, which opens or closes the lit, may be installed.

The slit door 150 is rotated by a hinge 152 to open or close the slit, and receives a recovery power by an elastic member (not shown).

The slit door 150 blocks the slit at an initial stage, and when the backlight unit is installed at the case 110 through the slit, the slit door 150 opens the slit by being pushed by the backlight unit. Moreover, when the backlight unit is separated from the case 110, the slit door 150 is moved back to the initial position to block the slit.

Thus, the slit door 150 prevents foreign substances from incoming to the inside of the case 110, at which the backlight unit is not installed.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display device comprising:
   a case including an install space inside the case, an opened display area at a front face of the case and a slit at a side of the case, with the slit connected to the install space;
   a display panel attached to the case at the install space to be exposed to the display area;
   a backlight unit installed at the install space after the display panel through the slit by sliding engagement;
   a push lock member disposed at an opposite side to the slit in the case and attaching and detaching the backlight unit in the case by pressing the backlight unit; and
   a guide frame installed in the case to support the backlight unit to guide a sliding movement of the backlight unit,
   wherein the push lock member includes an elastic member and a sliding cam, with the sliding cam being slid by the elastic member to combine and separate a lead-in connector and a lead-out connector; and
   wherein the guide frame includes a guide recess, at which the sliding cam is moved by a predetermined distance.

2. The display device of claim 1, wherein
   the lead-out connector is installed in the install space and provides power or a signal, and
   the lead-in connector is installed at the backlight unit and connects to the lead-out connector.

3. The display device of claim 2, wherein the lead-in connector and the lead-out connector are installed to connect to each other.

4. The display device of claim 3, wherein a gate is formed at a rear face of the case, and the gate is formed at a connecting part between the lead-in connector and the lead-out connector.

5. The display device of claim 2, wherein the lead-in connector and the lead-out connector include a socket structure, which is attached and connected by sliding engagement.

6. The display device of claim 1, wherein the backlight unit comprises a handle for ejecting disposed at a side face of the case exposing the slit.

7. The display device of claim 1, further comprising:
   an outline frame covering the slit.

* * * * *